(12) United States Patent
Mannami et al.

(10) Patent No.: US 10,260,894 B2
(45) Date of Patent: Apr. 16, 2019

(54) NAVIGATION DEVICE FOR EXECUTING REROUTING SEARCH AND NOTIFICATION METHOD

(71) Applicant: JVC KENWOOD Corporation, Yokohama-shi, Kanagawa (JP)

(72) Inventors: Kazuki Mannami, Yokohama (JP); Atsushi Saito, Yokohama (JP); Hiroyuki Nakajima, Yokohama (JP); Shimpei Kamaya, Yokohama (JP); Yasuma Suzuki, Yokohama (JP); Makoto Inada, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 73 days.

(21) Appl. No.: 15/459,580

(22) Filed: Mar. 15, 2017

(65) Prior Publication Data

US 2017/0276496 A1 Sep. 28, 2017

(30) Foreign Application Priority Data

Mar. 23, 2016 (JP) .................................. 2016-058757

(51) Int. Cl.
*G01C 21/34* (2006.01)
*G01C 21/20* (2006.01)

(52) U.S. Cl.
CPC ......... *G01C 21/3415* (2013.01); *G01C 21/20* (2013.01)

(58) Field of Classification Search
CPC .. G01C 21/3415; G01C 21/00; G01C 21/348; G01C 21/03; G01C 21/30; G01C 21/32;
(Continued)

(56) References Cited

U.S. PATENT DOCUMENTS 4,972,319 A * 11/1990 Delorme ................. G06T 17/05
340/990
5,030,117 A * 7/1991 Delorme ................. G06T 17/05
434/130

(Continued)

FOREIGN PATENT DOCUMENTS

JP 2012-215392 A 11/2012

OTHER PUBLICATIONS

Dees et al., Performance of Interconnection Rip-Up and Reroute Strategies, 1981, IEEE, p. 382-390 (Year: 1981).*

(Continued)

*Primary Examiner* — McDieunel Marc
(74) *Attorney, Agent, or Firm* — Brundidge & Stanger, P.C.

(57) ABSTRACT

A determiner determines execution of rerouting. A notifier notifies the execution of rerouting if the determiner determines the execution of rerouting. A searcher executes a rerouting search if the determiner determines the execution of rerouting. A measurer measures the distance by which a navigation device has moved along a guide route, which is a result of the rerouting search by the searcher. In a case in which the determiner determines execution of next rerouting, the notifier notifies the execution of rerouting if the measured distance is longer than a threshold value and does not notify the execution of rerouting if the measured distance is smaller than or equal to the threshold value.

5 Claims, 4 Drawing Sheets

(58) Field of Classification Search
CPC ........ G01C 36/26; G01C 21/26; G07C 5/008; G06T 17/05
See application file for complete search history.

(56) References Cited

U.S. PATENT DOCUMENTS

| | | | | |
|---|---|---|---|---|
| 6,321,158 | B1* | 11/2001 | DeLorme | G01C 21/26 340/995.16 |
| 7,680,596 | B2* | 3/2010 | Uyeki | G01C 21/3415 340/995.19 |
| 2004/0021583 | A1* | 2/2004 | Lau | G01C 21/3617 340/995.19 |
| 2010/0082234 | A1* | 4/2010 | Ohta | G01C 21/3626 701/533 |
| 2011/0106426 | A1* | 5/2011 | Tertoolen | G01C 21/3476 701/533 |
| 2012/0098677 | A1* | 4/2012 | Geelen | G01C 21/32 340/932.2 |
| 2012/0209507 | A1* | 8/2012 | Serbanescu | G01C 21/30 701/410 |
| 2013/0218453 | A1* | 8/2013 | Geelen | G01C 21/3461 701/410 |
| 2015/0219468 | A1* | 8/2015 | Ziezold | G01C 21/3453 701/410 |
| 2016/0069695 | A1* | 3/2016 | Broadbent | G01C 21/3691 701/411 |

OTHER PUBLICATIONS

Correia et al., A Proactive Management and Rerouting Framework for QoS Critical Distributed Applications Using Active Technology, 2004, IEEE, p. 1-8 (Year: 2004).*

Pan et al., DIVERT: A Distributed Vehicular Traffic Re-Routing System for Congestion Avoidance, 2016, IEEE, p. 58-72 (Year: 2016).*

Heisswolf et al., Rerouting: Scalable NoC self-optimization by distributed hardware-based connection reallocation, 2013, IEEE, p. 1-8 (Year: 2013).*

* cited by examiner

NAVIGATION DEVICE FOR EXECUTING REROUTING SEARCH AND NOTIFICATION METHOD

CROSS-REFERENCE TO RELATED APPLICATION

This application is based upon and claims the benefit of priority from the prior Japanese Patent Application No. 2016-058757, filed on Mar. 23, 2016, the entire contents of which are incorporated herein by reference.

BACKGROUND

1. Field

The present invention relates to notification techniques and particularly relates to a navigation device for executing rerouting search and a notification method.

2. Description of the Related Art

In a navigation device, based on recommended path data and current positional information, a recommended path ahead of the current position is displayed to be in an upper side of a display screen. On the other hand, if the current position deviates from the recommended path, the navigation device informs by a sound message that a rerouting process is to be carried out and executes the rerouting process (for example, see JP 2012-215392A).

Even when the rerouting process is carried out, rerouting processes frequently occur in some cases because of immediate deviation from a guide route, which is the recommended path, or since a user intentionally does not follow the guide route.

In such a case, sound messages about the execution of rerouting processes are frequently output.

SUMMARY

In order to solve the above described problem, a navigation device of an aspect of the present embodiments is a navigation device having: a determiner that determines execution of rerouting; a notifier that notifies the execution of the rerouting when the determiner determines the execution of the rerouting; a searcher that executes a rerouting search when the determiner determines the execution of the rerouting; and a measurer that measures a distance of movement of the navigation device along a guide route that is a result of the rerouting search by the searcher. In a case in which the determiner determines execution of next rerouting, the notifier notifies the execution of the next rerouting when the distance measured by the measurer is longer than a threshold value and does not notify the execution of the next rerouting when the distance measured by the measurer is smaller than or equal to the threshold value.

Another aspect of the embodiments is also a navigation device. This device is a navigation device having: a determiner that determines execution of rerouting; a notifier that notifies the execution of the rerouting when the determiner determines the execution of the rerouting; a searcher that executes a rerouting search when the determiner determines the execution of the rerouting; and a measurer that measures time of movement of the navigation device along a guide route that is a result of the rerouting search by the searcher. In a case in which the determiner determines execution of next rerouting, the notifier notifies the execution of the next rerouting when the time measured by the measurer is longer than a threshold value and does not notify the execution of the next rerouting when the time measured by the measurer is smaller than or equal to the threshold value.

A further another aspect of the embodiments is a notification method. This method is a notification method of a navigation device including: determining execution of rerouting; notifying the execution of the rerouting when the execution of the rerouting is determined; executing a rerouting search when the execution of the rerouting is determined; measuring a distance of movement of the navigation device along a guide route that is a result of the rerouting search; and in a case in which execution of next rerouting is determined, notifying the execution of the next rerouting when the measured distance is longer than a threshold value and not notifying the execution of the next rerouting when the measured distance is smaller than or equal to the threshold value.

A further another aspect of the embodiments is also a notification method. This method is a notification method of a navigation device including: determining execution of rerouting; notifying the execution of the rerouting when the execution of the rerouting is determined; executing a rerouting search when the execution of the rerouting is determined; measuring time of movement of the navigation device along a guide route that is a result of the rerouting search; and in a case in which execution of next rerouting is determined, notifying the execution of the next rerouting when the measured time is longer than a threshold value and not notifying the execution of the next rerouting when the measured time is smaller than or equal to the threshold value.

Note that arbitrary combinations of above constituent elements and expressions of the present embodiments converted among methods, devices, systems, recording media, computer programs, etc. are also effective as aspects of the present embodiments.

DETAILED DESCRIPTION

The invention will now be described by reference to the preferred embodiments. This does not intend to limit the scope of the present invention, but to exemplify the invention.

First Embodiment

First, outlines will be described before describing the present invention in detail. In a first embodiment, in a case in which a vehicle is deviated from a guide route while a path guiding function of a car navigation device is used, a search for a returning path to an original route or a rerouting process of reviewing the path to a destination is executed. Moreover, when the rerouting function is executed, an announcement such as "rerouting" is generally given in order to notify a driver of that. The cases in which the vehicle deviates from the guide route include a case in which the driver understands map/traffic conditions of the neighbor of a current location and intentionally selects to travel along a different route and an unintended case due to, for example, overlooking of a route or branching point guided on the car navigation device.

In both of the cases in which the deviation from the guide route occurs, the car navigation device immediately executes an announcement and executes a rerouting process. However, even when a new guide route is presented to the driver, a case that the driver deviates from the new guide route and that a rerouting process is repeated often occurs. In that case, the announcement of rerouting is often given. This announcement is annoying to the driver who intentionally travels along the route which is different from the guide route of the car navigation device. Meanwhile, for the driver who has unintentionally deviated from the guide route and is trying to return to the original route, this announcement is a factor which worsens anxieties. Therefore, it is required to improve the timing of the announcements of rerouting, to reduce the unnecessary announcements of rerouting, and also to execute the necessary announcements of rerouting.

A car navigation device according to the present embodiment presents a new guide route by executing a rerouting process. Moreover, the car navigation device measures the distance traveled by a vehicle along the new guide route. If the vehicle deviates from the new guide route, the car navigation device determines to execute a rerouting process again. In this process, if the measured distance is longer than a threshold value, the car navigation device outputs an announcement of rerouting and executes a rerouting process. On the other hand, if the measured distance is smaller than or equal to the threshold value, the car navigation device executes a rerouting process without outputting the announcement of rerouting.

Figure 1:
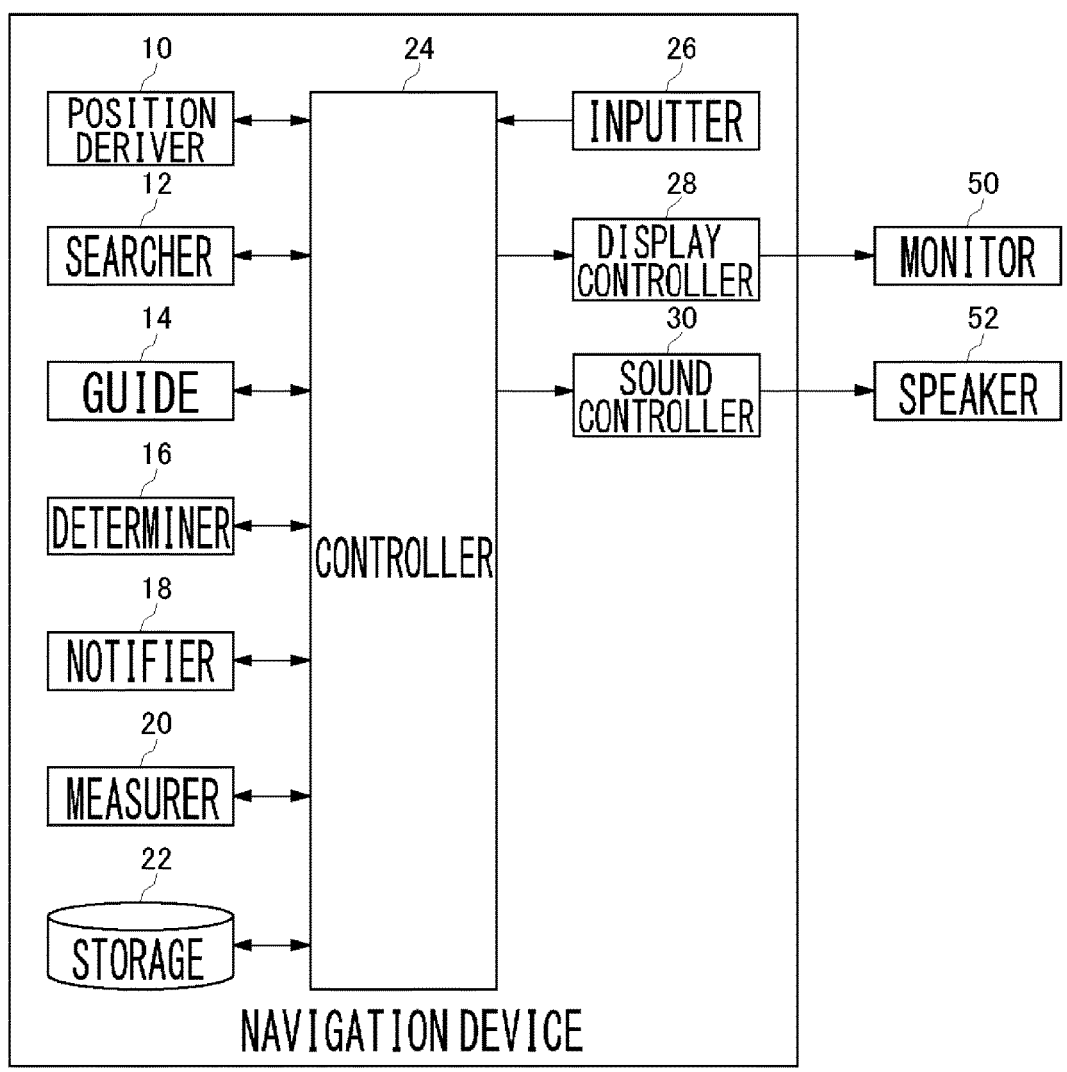
FIG. 1 is a view showing a configuration of a navigation device according to a first embodiment.

FIG. 1 shows a configuration of a navigation device 100 according to the first embodiment. The navigation device 100 includes a position deriver 10, a searcher 12, a guide 14, a determiner 16, a notifier 18, a measurer 20, a storage 22, a controller 24, an inputter 26, a display controller 28, and a sound controller 30. Moreover, the navigation device 100 is connected to a monitor 50 and a speaker 52. Note that the navigation device 100 is mounted on a vehicle, which is not shown in the drawings.

The position deriver 10 receives signals from GPS (Global Positioning System) satellites, thereby measuring the position of a vehicle and derives positional information of the vehicle. The positional information includes a longitude and a latitude. Since publicly known techniques may be used in the measurement of the position of the vehicle by GPS, description thereof will be omitted in this case. Also, the positional information may be derived by using publicly known techniques other than GPS. The position deriver 10 periodically acquires the positional information and sequentially outputs the positional information to the controller 24.

The inputter 26 is a user interface for inputting operations from a driver and, for example, includes a button or a touch panel. The inputter 26 inputs instructions from the driver, in this case, information about a destination of a path guide. The information about the destination includes a latitude and a longitude. The inputter 26 outputs the information about the destination to the controller 24.

The positional information from the position deriver 10 and the information about the destination from the inputter 26 are input to the searcher 12 via the controller 24. Herein, the positional information from the position deriver 10 corresponds to a departure location. Moreover, the searcher 12 references map data, which is stored in the storage 22, via the controller 24, thereby executing a route search from the departure location to the destination. Since the route search may use publicly known techniques, description thereof will be omitted in this case. The searcher 12 outputs a guide route, which is a search result, to the controller 24 via the controller 24.

Via the controller 24, the guide route from the searcher 12 is input to the guide 14, and the positional information from the position deriver 10 is sequentially input to the guide 14. The guide 14 derives the map data by accessing the storage 22 via the controller 24 and generates a picture showing the guide route and a current position on the map data. This picture is updated by updating the positional information. Furthermore, the guide 14 generates an announcement of the path guide corresponding to the picture. This announcement can be also referred to as a sound message. The guide 14 outputs the picture to the display controller 28 via the controller 24. The display controller 28 causes the monitor 50 to display the picture. The guide 14 outputs the announcement to the sound controller 30 via the controller 24. The sound controller 30 causes the speaker 52 to output the announcement.

In this manner, the guide 14 executes the path guide by the picture and sound. Note that the path guide may be carried out by only either one of the picture and the sound. Furthermore, when the path guide is to be started, the guide 14 initializes the number of times of rerouting and distance data of movement on the guide route. These will be described later, but these are stored in the storage 22.

Via the controller 24, the guide route from the searcher 12 is input to the determiner 16, and the positional information from the position deriver 10 is sequentially input to the determiner 16. The determiner 16 monitors whether the current position shown by the positional information is deviated from the guide route or not. For example, if the distance between the current position and the guide route is larger than a predetermined value, the determiner 16 detects that the current position shown by the positional information is deviated from the guide route. If the current position shown by the positional information is deviated from the guide route, the determiner 16 determines execution of a rerouting process. The determiner 16 outputs a determination result to the controller 24.

When the determination result from the determiner 16 is input via the controller 24, the notifier 18 checks the number of times of rerouting stored in the storage 22 and, if the number of times of rerouting is "0", gives a notification of execution of rerouting. The notification of execution of rerouting is output as an announcement from the speaker 52 via the controller 24 and the sound controller 30. More specifically, if it is a rerouting search of a first time since the path guide is started in the case in which the execution of rerouting is determined by the determiner 16, the announcement is output.

When the determination result from the determiner 16 is input via the controller 24, the searcher 12 executes a rerouting process, in other words, a rerouting search. The rerouting search is carried out similarly to the above described route search, and a new guide route from the latest positional information to the destination is derived. The searcher 12 outputs the new guide route to the controller 24 via the controller 24.

Via the controller 24, the new guide route from the searcher 12 is input to the guide 14, and the positional information from the position deriver 10 is sequentially input to the guide 14. The guide 14 executes a process similar to the previous process, thereby executing a path guide by the new guide route. Furthermore, the guide 14 outputs the positional information of the point at which the path guide by the new guide route is started to the measurer 20 via the controller 24. Furthermore, when the path guide by the new guide route is to be started, the guide 14 increments the number of times of rerouting stored in the storage 22.

When the positional information from the guide 14 is input, the measurer 20 uses this as a starting point and measures the distance traveled by the vehicle along the new guide route. Publicly known techniques may be used in the measurement of the distance. In this case, the positional information from the position deriver 10 is input via the controller 24, and this is used in the measurement of the distance. When the vehicle moves along the guide route, this distance is constantly added in accordance with the moved distance. The measurer 20 updates the distance data, which is stored in the storage 22, depending on the measured distance.

Via the controller 24, the new guide route from the searcher 12 is input to the determiner 16, and the positional information from the position deriver 10 is sequentially input thereto. Similarly to the previous case, the determiner 16 monitors whether the current position shown by the positional information is deviated from the new guide route or not. If the current position shown by the positional information is deviated from the guide route, the determiner 16 determines execution of a rerouting process. The determiner 16 outputs a determination result to the controller 24.

When the determination result from the determiner 16 is input via the controller 24, the notifier 18 checks the number of times of rerouting stored in the storage 22 and, if the number of times of rerouting is larger than or equal to "1", recognizes that the determiner 16 has determined the execution of rerouting of a second or more time. If it is recognized that the determiner 16 has determined the execution of rerouting of the second or more time, the notifier 18 derives the distance data stored in the storage 22, in other words, the distance measured by the measurer 20. If the distance is longer than a threshold value, the notifier 18 subjects execution of next rerouting to notification; and, if the distance is smaller than or equal to the threshold value, the notifier 18 does not subject execution of next rerouting to notification. Herein, the threshold value is set in advance. In other words, execution of next rerouting is subjected to notification if the vehicle has traveled for the distance longer than the threshold value along the new guide route after the rerouting. However, execution of next rerouting is not subjected to notification if the vehicle has not traveled for the distance longer than the threshold value. The notification of execution of next rerouting is carried out similarly to the previous case.

The searcher 12, the guide 14, and the measurer 20 execute processes similar to the rerouting of the first time. In this process, the guide 14 increments the number of times of rerouting stored in the storage 22 and initializes the distance data. Then, the above described processes are repeated until the vehicle arrives at the destination.

Note that, even in the case in which the execution of next rerouting is not determined by the determiner 16, if the vehicle is deviated from the new guide route, the measurer 20 stops measuring the distance. This corresponds to not adding the distance in the case in which the current position and the new guide route are distant from each other while the distance between the current position and the new guide route is within a predetermined value.

In terms of hardware, this configuration can be realized by a CPU, a memory, and other LSI of an arbitrary computer. In terms of software, this configuration is realized by a program, etc. loaded to a memory. However, herein, functional blocks realized by cooperating them are illustrated. Therefore, it is understood by those skilled in the art that these functional blocks can be realized by various forms, i.e., only by hardware, only by software, or by combination thereof.

Figure 2:
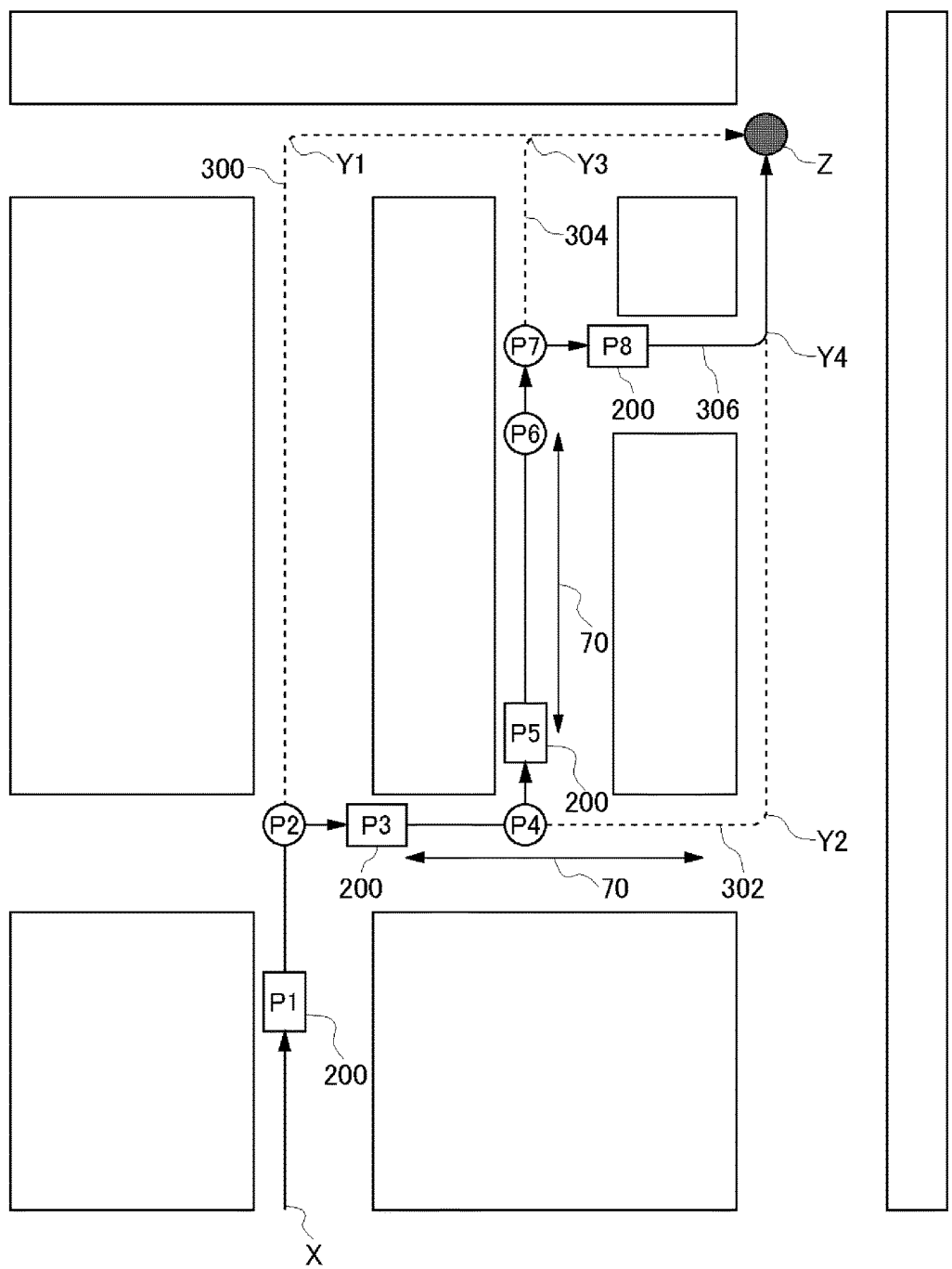
FIG. 2 is a view showing process outlines of the navigation device of FIG. 1.

FIG. 2 shows process outlines of the navigation device 100 and shows a view, from an upper side, of a case in which a vehicle 200 on which the navigation device 100 is mounted is going to a destination Z from a departure location X. The vehicle 200 departs from the departure location X and arrives at the destination Z via a point P1, a point P2, . . . , and a point P8. At the departure location X, an original guide route 300, which arrives at the destination Z through the point P1, the point P2, an intermediate point Y1, and an intermediate point Y3 in this order, is subjected to notification. At the point P1, the vehicle 200 is moving on the original guide route 300.

At the point P2, the vehicle 200 is separated from the original guide route 300 to the direction of an arrow. The navigation device 100 determines execution of rerouting. At the point P3, the vehicle 200 is separated from the original guide route 300 and further moves forward. Since the navigation device 100 executes a rerouting search of a first time, an announcement of the rerouting execution is executed in this process. By the rerouting, an after-first-time-rerouting guide route 302, which is from the point P3 and arrives at the destination Z through the point P4, an intermediate point Y2, and an intermediate point Y4 in this order, is subjected to notification. Moreover, the navigation device 100 starts measuring the distance from the point P3.

At the point P4, the vehicle 200 is separated from the after-first-time-rerouting guide route 302 to the direction of an arrow. The navigation device 100 determines execution of rerouting. At the point P5, the vehicle 200 is separated from the after-first-time-rerouting guide route 302 and further moves forward. The navigation device 100 executes a rerouting search of a second time. On the other hand, since the distance from the point P3 to the point P5 is smaller than or equal to a threshold value 70, the navigation device 100 does not execute an announcement upon the rerouting search. By the rerouting, an after-second-time-rerouting guide route 304, which is from the point P5 and arrives at the destination Z through the point P6, the point P7, and the intermediate point Y3 in this order, is subjected to notification. Moreover, the navigation device 100 starts measuring the distance from the point P5.

At the point P6, the vehicle 200 is moving on the after-second-time-rerouting guide route 304. At the point P7, the vehicle 200 is separated from the after-second-time-rerouting guide route 304 to the direction of an arrow. The navigation device 100 determines execution of rerouting. At the point P8, the vehicle 200 is separated from the after-second-time-rerouting guide route 304 and further moves forward. The navigation device 100 executes a rerouting search of a third time. On the other hand, since the distance from the point P5 to the point P8 is longer than the threshold value 70, the navigation device 100 executes an announcement upon the rerouting search. By the rerouting, an after-third-time-rerouting guide route 306, which is from the point P8 and arrives at the destination Z sequentially through an intermediate point Y4, is subjected to notification. Moreover, the navigation device 100 starts measuring the distance from the point P8.

Figure 3:
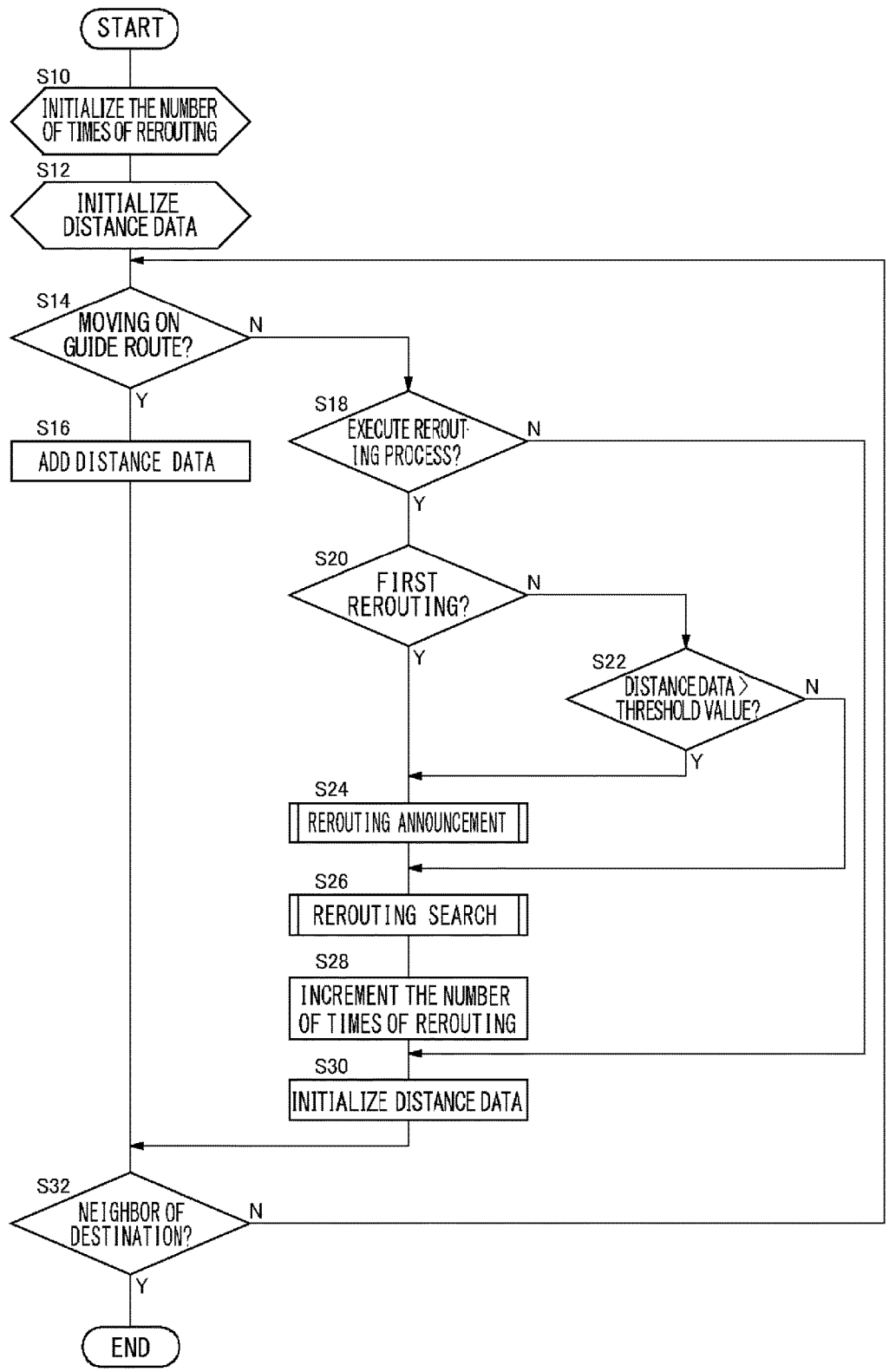
FIG. 3 is a flow chart showing a processing procedure according to the navigation device of FIG. 1.

Operations of the navigation device 100 according to the above described configuration will be described. FIG. 3 is a flow chart showing a processing procedure according to the navigation device 100. The guide 14 initializes the number of times of rerouting (S10) and initializes distance data (S12). If it is moving on the guide route (Y of S14), the measurer 20 adds distance data (S16). In the case in which it is not moving on the guide route (N of S14) and the determiner 16 determines to execute a rerouting process (Y of S18), if this is rerouting of a first time (Y of S20), the notifier 18 executes an announcement of the rerouting (S24).

If it is not the rerouting of the first time (N of S20) and if the distance data is larger than the threshold value (Y of S22), the notifier 18 executes the announcement of the rerouting (S24). If the distance data is not larger than the threshold value (N of S22), step 24 is skipped. The searcher 12 executes a rerouting search (S26), and the guide 14 increments the number of times of rerouting (S28) and initializes the distance data (S30). Meanwhile, if the determiner 16 does not determine to execute the rerouting process (N of S18), the process skips to step 30. If it is not the neighbor of the destination (N of S32), the process returns to step 14. If it is the neighbor of the destination (Y of S32), the process is terminated.

According to the present embodiment, whether the execution of next rerouting is to be subjected to notification or not is determined depending on the distance from the rerouting. Therefore, whether the notification is to be carried out or not can be determined depending on the degree of following the guide route after the rerouting. Moreover, since execution of rerouting is subjected to notification if the distance after the rerouting is longer than the threshold value, deviation from the guide route after the rerouting can be subjected to notification. Moreover, since the execution or rerouting is not subjected to notification if the distance from the rerouting is smaller than or equal to the threshold value, re-notification at a short interval can be prevented. Moreover, since whether the execution of next rerouting is to be subjected to notification or not is determined depending on the distance from the rerouting, a sound message about the execution of the rerouting process can be output at appropriate timing.

Moreover, since the number of times of announcements upon rerouting is effectively reduced, if a driver intentionally changes a path, the driver does not have to hear an unnecessary announcement, and annoyance in terms of hearing is prevented. Moreover, also in a case in which unintentional path changes continuously occur, multiple times of announcements are not repeated in a short period of time, and anxieties of a user can be reduced. Moreover, since the measurement of the distance is stopped in the case in which the vehicle deviates from the guide route even if execution of next rerouting is not determined, measurement precision can be improved.

Second Embodiment

Next, a second embodiment will be described. The second embodiment relates to execution of necessary rerouting announcements while reducing unnecessary rerouting announcements in a car navigation device. In the first embodiment, the distance traveled by the vehicle on a new guide route is measured, an announcement of rerouting is output if the measured distance is longer than the threshold value, and the announcement of rerouting is not output if the measured distance is smaller than or equal to the threshold value. On the other hand, in the second embodiment, instead of measuring the distance, time is measured. A navigation device 100 according to the second embodiment is a type similar to that of FIG. 1. Herein, differences from the first embodiment will be mainly described.

As described above, the guide 14 executes path guide by pictures and sound. Furthermore, when the first path guide is to be started, the guide 14 initializes the number of times of rerouting and time data of movement on a guide route. These are stored in the storage 22. Moreover, the guide 14 outputs the timing at which the path guide by a new guide route is started to the measurer 20 via the controller 24. Furthermore, when the path guide by the new guide route is to be started, the guide 14 increments the number of times of rerouting stored in the storage 22.

When the timing from the guide 14 is input, the measurer 20 uses this as starting timing and measures the time traveled by the vehicle along the new guide route. Publicly known techniques may be used in the measurement of time; wherein, for example, the measurer 20 is provided with a clock oscillator and executes count-up. When the vehicle moves along the guide route, this time is constantly added in accordance with the moved amount. The measurer 20 updates the time data, which is stored in the storage 22, depending on the measured time.

When the determination result from the determiner 16 is input via the controller 24, the notifier 18 checks the number of times of rerouting stored in the storage 22 and, if the number of times of rerouting is larger than or equal to "1", recognizes that the determiner 16 has determined the execution of rerouting of a second or more time. If it is recognized that the determiner 16 has determined the execution of rerouting of the second or more time, the notifier 18 derives the time data stored in the storage 22, in other words, the time measured by the measurer 20. If the time is longer than a threshold value, the notifier 18 subjects execution of next rerouting to notification; and, if the time is smaller than or equal to the threshold value, the notifier 18 does not subject execution of next rerouting to notification. Also in this case, the threshold value is set in advance. In other words, execution of next rerouting is subjected to notification if the vehicle has traveled for the time longer than the threshold value along the new guide route after the rerouting. However, execution of next rerouting is not subjected to notification if the vehicle has not traveled for the time longer than the threshold value. The notification of execution of next rerouting is carried out similarly to the previous case.

Note that, even in the case in which the execution of next rerouting is not determined by the determiner 16, if the vehicle deviates from the new guide route, the measurer 20 stops measuring the time. This corresponds to not adding the time in the case in which the current position and the new guide route are distant from each other while the distance between the current position and the new guide route is within a predetermined value.

Figure 4:
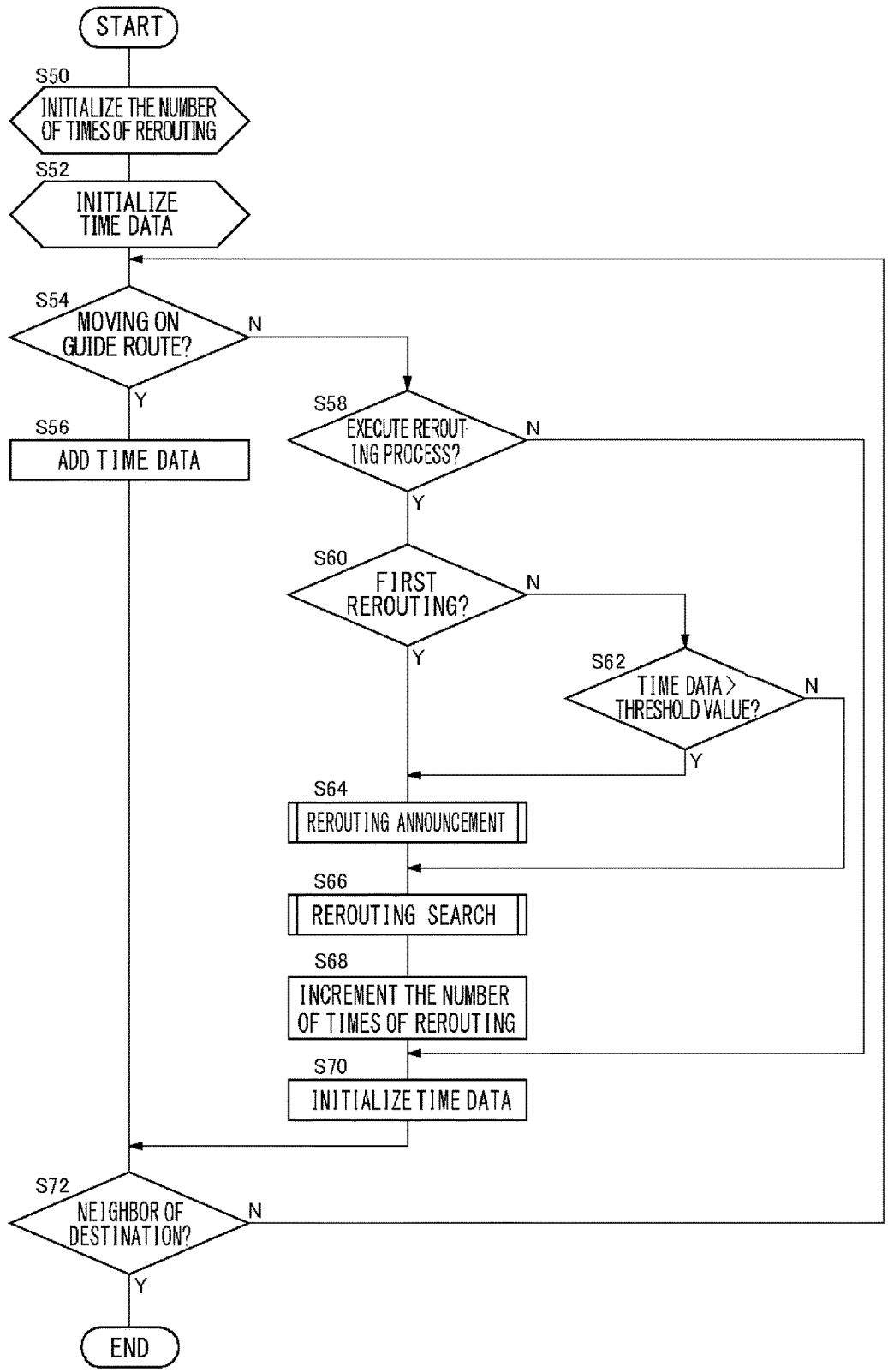
FIG. 4 is a flow chart showing a processing procedure according to a navigation device according to a second embodiment.

Operations of the navigation device 100 according to the above described configuration will be described. FIG. 4 is a flow chart showing a processing procedure according to the navigation device 100. The guide 14 initializes the number of times of rerouting (S50) and initializes time data (S52). If it is moving on the guide route (Y of S54), the measurer 20 adds time data (S56). In the case in which it is not moving on the guide route (N of S54) and the determiner 16 determines to execute a rerouting process (Y of S58), if this is rerouting of a first time (Y of S60), the notifier 18 executes an announcement of the rerouting (S64).

If it is not the rerouting of the first time (N of S60) and if the time data is larger than the threshold value (Y of S62), the notifier 18 executes the announcement of the rerouting (S64). If the time data is not larger than the threshold value (N of S62), step 64 is skipped. The searcher 12 executes a rerouting search (S66), and the guide 14 increments the number of times of rerouting (S68) and initializes the time data (S70). Meanwhile, if the determiner 16 does not determine to execute the rerouting process (N of S58), the process skips to step 70. If it is not the neighbor of the destination (N of S72), the process returns to step 54. If it is the neighbor of the destination (Y of S72), the process is terminated.

According to the present embodiment, whether the execution of next rerouting is to be subjected to notification or not is determined depending on the time from the rerouting. Therefore, whether the notification is to be carried out or not can be determined depending on the degree of following the guide route after the rerouting. Moreover, since execution of rerouting is subjected to notification if the time after the rerouting is longer than the threshold value, deviation from the guide route after the rerouting can be subjected to notification. Moreover, since the execution or rerouting is not subjected to notification if the time from the rerouting is smaller than or equal to the threshold value, re-notification at a short interval can be prevented. Moreover, since whether the execution of next rerouting is to be subjected to notification or not is determined depending on the time from the rerouting, a sound message about the execution of the rerouting process can be output at appropriate timing. Moreover, since the measurement of the time is stopped in the case in which the vehicle deviates from the guide route even if execution of next rerouting is not determined, measurement precision can be improved.

The present invention is described above based on the embodiments. These embodiments are examples, and it is understood by those skilled in the art that various modifications can be made for the combinations of constituent elements and processes thereof and that those modifications are also within the scope of the present invention.

In the first and second embodiments, the notifier 18 executes the announcement of rerouting if the distance or the time measured by the measurer 20 is longer than the threshold value. However, no limitation is imposed by this, and, for example, the notifier 18 may execute the announcement of rerouting when a region (unit such as prefecture, city, etc.) is changed from the location at which the rerouting search of a previous time has occurred. According to this modification example, the degree of freedom of configuration can be improved.

What is claimed is:

1. A navigation device that includes a memory storing a program that, in response to execution, causes a processor to perform operations comprising:
    a determiner that determines execution of rerouting;
    a notifier that notifies the execution of the rerouting when the determiner determines the execution of the rerouting;
    a searcher that executes a rerouting search when the determiner determines the execution of the rerouting; and
    a measurer that measures a distance of movement of the navigation device along a guide route that is a result of the rerouting search by the searcher, wherein in a case in which the determiner determines execution of next rerouting, the notifier notifies the execution of the next rerouting when the distance measured by the measurer is longer than a threshold value and does not notify the execution of the next rerouting when the distance measured by the measurer is smaller than or equal to the threshold value.

2. The navigation device according to claim 1, wherein, even in a case in which the execution of the next rerouting is not determined by the determiner, when the navigation device deviates from the guide route that is the result of the rerouting search by the searcher, the measurer stops measuring the distance.

3. A navigation device that includes a memory storing a program that, in response to execution, causes a processor to perform operations comprising:
    a determiner that determines execution of rerouting;
    a notifier that notifies the execution of the rerouting when the determiner determines the execution of the rerouting;
    a searcher that executes a rerouting search when the determiner determines the execution of the rerouting; and
    a measurer that measures time of movement of the navigation device along a guide route that is a result of the rerouting search by the searcher, wherein in a case in which the determiner determines execution of next rerouting, the notifier notifies the execution of the next rerouting when the time measured by the measurer is longer than a threshold value and does not notify the execution of the next rerouting when the time measured by the measurer is smaller than or equal to the threshold value.

4. The navigation device according to claim 3, wherein, even in a case in which the execution of the next rerouting is not determined by the determiner, when the navigation device deviates from the guide route that is the result of the rerouting search by the searcher, the measurer stops measuring the time.

5. A notification method of a navigation device that includes a memory storing a program that, in response to execution, causes a processor to perform operations comprising:
    determining execution of rerouting;
    notifying the execution of the rerouting when the execution of the rerouting is determined;
    executing a rerouting search when the execution of the rerouting is determined; measuring a distance of movement of the navigation device along a guide route that is a result of the rerouting search; and
    in a case in which execution of next rerouting is determined, notifying the execution of the next rerouting when the measured distance is longer than a threshold value and not notifying the execution of the next rerouting when the measured distance is smaller than or equal to the threshold value.

* * * * *